(12) United States Patent
Zhu et al.

(10) Patent No.: US 10,944,717 B2
(45) Date of Patent: Mar. 9, 2021

(54) LSB BASED SYMMETRIC RECEIVE-SIDE SCALING

(71) Applicant: Stellar Cyber, inc., Santa Clara, CA (US)

(72) Inventors: Feng Zhu, San Jose, CA (US); Aimei Wei, Cupertino, CA (US)

(73) Assignee: Stellar Cyber, inc., Santa Clara, CA (US)

( * ) Notice: Subject to any disclaimer, the term of this patent is extended or adjusted under 35 U.S.C. 154(b) by 0 days.

(21) Appl. No.: 16/298,815

(22) Filed: Mar. 11, 2019

(65) Prior Publication Data

US 2019/0281018 A1    Sep. 12, 2019

Related U.S. Application Data

(60) Provisional application No. 62/641,695, filed on Mar. 12, 2018.

(51) Int. Cl.
*H04L 29/12* (2006.01)
*H04L 29/06* (2006.01)

(52) U.S. Cl.
CPC ...... *H04L 61/6063* (2013.01); *H04L 61/6086* (2013.01)

(58) Field of Classification Search
None
See application file for complete search history.

(56) References Cited

U.S. PATENT DOCUMENTS

| | | | | |
|---|---|---|---|---|
| 7,957,396 B1* | 6/2011 | Kohn | ............... | H04L 47/2441 370/395.32 |
| 9,712,460 B1* | 7/2017 | Friend | ............... | H04L 47/35 |
| 2004/0125799 A1* | 7/2004 | Buer | ............... | G06F 16/9014 370/389 |
| 2008/0181103 A1* | 7/2008 | Davies | ............... | H04L 47/10 370/230 |

(Continued)

OTHER PUBLICATIONS

Kourtis, K., P. Shinde, A. Kaufmann and T. Roscoe. "Intelligent NIC Queue Management in the Dragonet Network Stack." (2015). (Year: 2015).*

(Continued)

*Primary Examiner* — Faruk Hamza
*Assistant Examiner* — Cassandra L Decker (57) ABSTRACT

A computer-implemented method includes generating a hash key using a number of least significant bits (LSBs) for indexing an indirection table in a computing system including multiple processing cores. In generating the hash key, symmetry constraints for a request packet and a response packet through a same communication channel are computed. The symmetry constraints include at least a condition where the LSBs of a hash value corresponding to a source or destination IP address of the request packet are equal to the LSBs of a hash value corresponding to a destination or source IP address of the response packet, wherein the LSBs of the hash value of the request and response packets are of a number same as the number of LSBs used for indexing the indirection table. A string of bits are subjected to the symmetry constraints and adjusted to satisfy the symmetry constraints to generate the hash key.

20 Claims, 8 Drawing Sheets

(56) References Cited

U.S. PATENT DOCUMENTS

| | | | | |
|---|---|---|---|---|
| 2008/0281900 A1* | 11/2008 | Boulia | .................. | H04L 63/029 |
| | | | | 709/201 |
| 2010/0083259 A1* | 4/2010 | Veal | ..................... | G06F 9/5088 |
| | | | | 718/102 |
| 2011/0153861 A1* | 6/2011 | Chauhan | ................. | H04L 69/04 |
| | | | | 709/232 |
| 2012/0155494 A1* | 6/2012 | Basso | ..................... | H04L 45/50 |
| | | | | 370/474 |
| 2014/0304504 A1* | 10/2014 | Park | ........................ | H04L 63/02 |
| | | | | 713/162 |
| 2015/0312144 A1* | 10/2015 | Gobriel | .............. | H04L 45/7453 |
| | | | | 709/242 |
| 2017/0093792 A1* | 3/2017 | Marom | ............... | H04L 61/2514 |
| 2018/0034719 A1* | 2/2018 | Fattah | ................. | G06F 11/3041 |

OTHER PUBLICATIONS

W. Shinae and P. KyoungSoo, "Scalable TCP session monitoring with Symmetric Receive-Side Scaling," KAIST, Daejeon, Korea, Tech. Rep, 2012 (Year: 2012).*

* cited by examiner

Table A

| CPU | 0 | 1 | 2 | 3 | 0 | 1 | 2 | 3 | ... | 2 | 3 |
|---|---|---|---|---|---|---|---|---|---|---|---|
| INDEX | 0 | 1 | 2 | 3 | 4 | 5 | 6 | 7 | ... | 62 | 63 |

307a

Table B

| CPU | 0 | 1 | 3 | 3 | 0 | 1 | 3 | 3 | ... | 2 | 3 |
|---|---|---|---|---|---|---|---|---|---|---|---|
| INDEX | 0 | 1 | 2 | 3 | 4 | 5 | 6 | 7 | ... | 62 | 63 |

LSB BASED SYMMETRIC RECEIVE-SIDE SCALING

CROSS-REFERENCE TO RELATED APPLICATIONS

This application claims the benefit of and priority to U.S. Provisional Application No. 62/641,695 filed Mar. 12, 2018, the disclosure of all of which is incorporated herein by reference in its entirety.

TECHNICAL FIELD

This application relates generally to receive-side scaling (RSS) of data packets. In particular, various embodiments of systems and methods for least significant bits (LSBs) based symmetric RSS of data packets are described.

BACKGROUND

Modern high-end computing systems such as server machines in data centers may include multiple processors to improve computation power. The computing systems may also have multiple high-speed Input/Output (I/O) interfaces such as Ethernet interfaces to move data packets in and out of the computer systems.

In today's computer networks, Transmission Control Protocol/Internet Protocol (TCP/IP) protocol suite is employed widely. The TCP/IP protocol suite provides end-to-end data communication specifying information on packetization, addressing, transmission, routing, and reception. With TCP/IP, a communication channel between two computing systems are identified by a connection with information about the computing systems. The IP addresses and port numbers of the computing systems and the associated protocol such as TCP or user datagram protocol (UDP) constitute a header of a data packet, uniquely identifying a TCP/IP connection between the computing systems.

Receive-Side Scaling (RSS) is a network driver technology that enables efficient load balancing on processing received data packets across multiple processors in a multiprocessor computer system. RSS can improve network system performance by reducing processing delays by distributing receive processing from a Network Interface Card (NIC) across multiple processors. This helps ensure that one processor is not heavily loaded while another processor is idle.

One challenge that RSS design faces is to ensure that packet processing that is associated with a given TCP/IP connection stays on an assigned processor. In conventional RSS design, an NIC in a computing system implementing RSS may map data packets in a same TCP connection to different receive queues depending on the direction of the data packets. In applications involving high-performance TCP-session processing systems such as firewalls and intrusion detection systems that need to monitor and process data packets in both directions, the conventional RSS design may not be efficient. For two processors in a computing system to process data packets in both directions in a same connection requires sharing data structures of the data packets across different threads/processes and may also require protection by a lock, undermining the benefit of RSS.

Therefore, there is a general need for an improved system and method for RSS. There is a particular need for a system and method for generation of hash keys which can be implemented in RSS to allow data packets in both forward and backward directions of a same connection to be load-balanced in a multiprocessor computing system.

BRIEF SUMMARY

Some embodiments of the disclosure provide a computer-implemented method comprising determining a number of least significant bits (LSBs) used for indexing an indirection table in a computing system including multiple processing cores and generating a hash key for implementation in the computing system. In generating the hash key, symmetry constraints for a request packet and a response packet through a same communication channel are computed. The symmetry constraints include at least a condition where the LSBs of a hash value of a bit or bits corresponding to a source or destination IP address of the request packet are equal to the LSBs of a hash value of the bit or bits corresponding to a destination or source IP address of the response packet, wherein the LSBs of the hash value of the bit of the request and response packets are of a number same as the number of LSBs used for indexing the indirection table. A string of bits are subjected to the symmetry constraints and adjusted to satisfy the symmetry constraints to generate the hash key.

Some embodiments of the disclosure provide a non-transitory computer-readable medium having stored thereon program code instructions that, when executed by a computing apparatus, cause the computing apparatus to carry out operations to generate a hash key. The operations comprise determining a number of least significant bits (LSBs) used for indexing an indirection table in a computing system including multiple processing cores and generating a hash key for implementation in the computing system. In generating the hash key, symmetry constraints for a request packet and a response packet through a same communication channel are computed. The symmetry constraints include at least a condition where the LSBs of a hash value of a bit or bits corresponding to a source or destination IP address of the request packet are equal to the LSBs of a hash value of the bit or bits corresponding to a destination or source IP address of the response packet, wherein the LSBs of the hash value of the bit of the request and response packets are of a number same as the number of LSBs used for indexing the indirection table. A string of bits are subjected to the symmetry constraints and adjusted to satisfy the symmetry constraints to generate the hash key.

Some embodiments of the disclosure provide an apparatus comprising a memory storing computer-readable program code instructions and a controller configured to execute the program code instructions. The computer-readable program code instructions comprise determining a number of least significant bits (LSBs) used for indexing an indirection table in a computing system including multiple processing cores and generating a hash key for implementation in the computing system. In generating the hash key, symmetry constraints for a request packet and a response packet through a same communication channel are computed. The symmetry constraints include at least a condition where the LSBs of a hash value of a bit or bits corresponding to a source or destination IP address of the request packet are equal to the LSBs of a hash value of the bit or bits corresponding to a destination or source IP address of the response packet, wherein the LSBs of the hash value of the bit of the request and response packets are of a number same as the number of LSBs used for indexing the indirection table. A string of bits are subjected to the symmetry constraints and adjusted to satisfy the symmetry constraints to generate the hash key.

This Brief Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION OF EMBODIMENTS

Various embodiments will now be described with reference to the figures. It should be noted that some figures are not necessarily drawn to scale. The figures are only intended to facilitate the description of specific embodiments, and are not intended as an exhaustive description or as a limitation on the scope of the disclosure. Further, in the figures and description, specific details may be set forth in order to provide a thorough understanding of the disclosure. It will be apparent to one of ordinary skill in the art that some of these specific details may not be employed to practice embodiments of the disclosure. In other instances, well known components or process steps may not be shown or described in detail in order to avoid unnecessarily obscuring embodiments of the disclosure.

Figure 1:
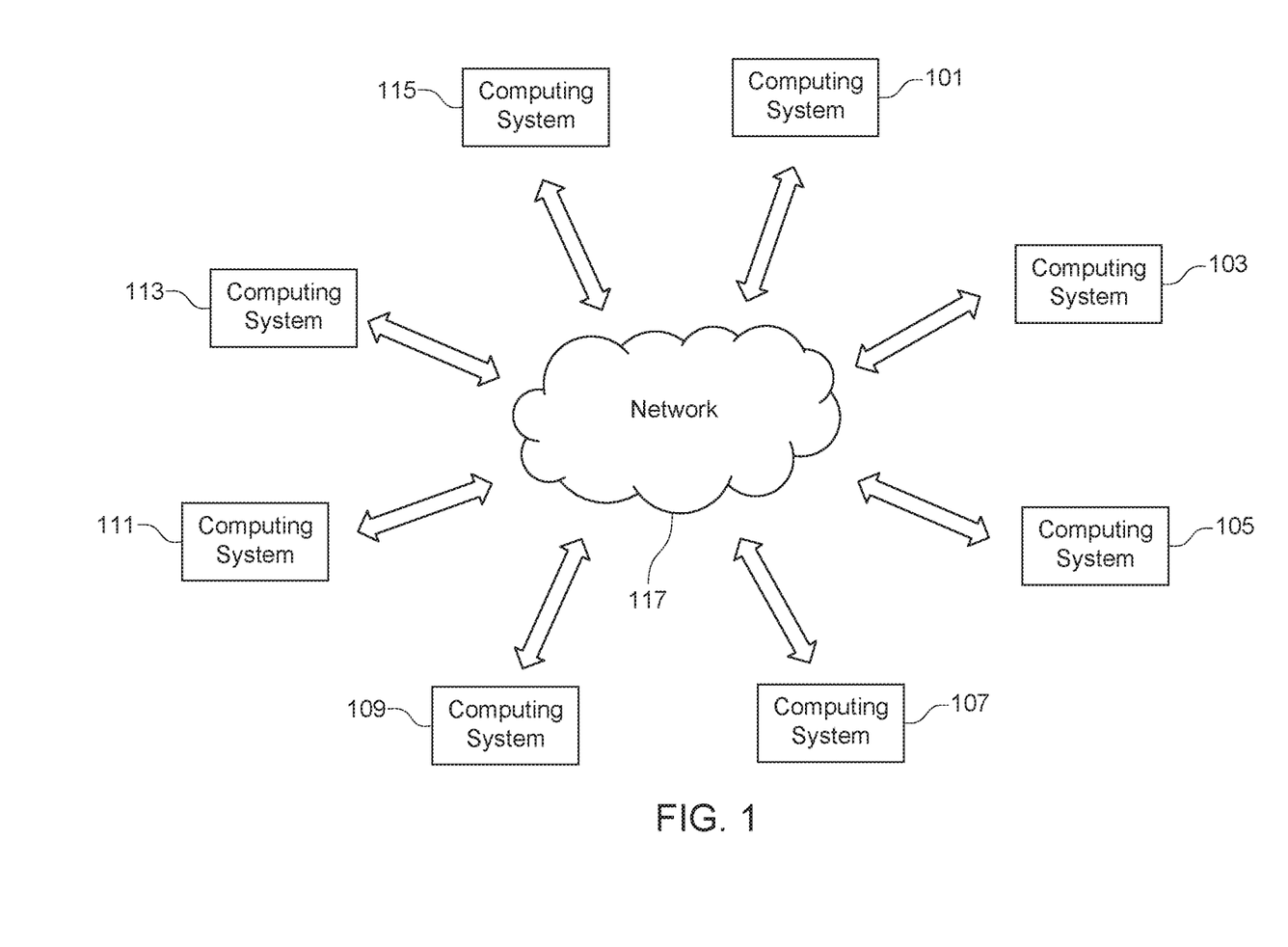
FIG. 1 is a block diagram showing a plurality of computing systems in a communication network in which the techniques described in various embodiments of this disclosure can be employed.

FIG. 1 is a block diagram illustrating a plurality of computing systems 101-115 in communication over a network 117, which can employ LSB based symmetric RSS according to embodiments of this disclosure. As used herein, the term "RSS" refers to a network driver technology in one or more of computing systems 101-115 that enables efficient distribution of processing of data packets exchanged between the computing systems, across multiple processing cores or CPUs in the computing systems 101-115. RSS enables receive processing to scale with the number of available processing cores by allowing network load from a network interface controller or network interface card to be balanced across the multiple processing cores. As used herein, the term "computing system" may refer to a personal computer, a tablet computing device, a mobile computer, a portable computing device, a laptop, a touch centric device, a workstation, a server, a portable electronic device, a network enabled computing device, an interactive network enabled communication device, any other suitable computing equipment, combinations of multiple pieces of computing equipment, and the like. The computing systems 101-115 may be multiprocessor systems, that is, each of the computing systems 101-115 may comprise a plurality of processing cores. The computing systems 101-115 may be symmetric multiprocessor systems comprising homogenous processing cores accessing a shared memory under a single operating system. Alternatively, the computing systems 101-115 may be asymmetric multiprocessor systems.

The network 117 over which the plurality of computing systems 101-115 communicate may be the Internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The network 117 may include a plurality of networking components or devices, such as, routers, gateways, hubs, etc., that allow the plurality of computing systems 101-115 to communicate with each over a wired or a wireless media.

Each of the plurality of computing systems 101-115 may transmit data packets to and receive data packets from the other computing systems 101-115 over the network 117. As used herein, the term "data packet" refers to a sequence of one or more symbols and/or values that may be encoded by one or more signals transmitted from one computing system e.g. 101 to another computing system e.g. 103. The data packets may employ communication protocols such as, TCP or UDP. A data packet comprises a header and a payload. The payload of a data packet defines the content or information being transmitted from one computing system e.g. 101 to another computing system e.g. 103.

The header of a data packet may identify the source and destination of the data packet. The identification information of a data packet may include the IP address of a source node e.g. computing system 101, and the IP address of a destination node e.g. another computing system 103. The header of a data packet may further include the port number of the source node e.g. computing system 101 and the port number of the destination node e.g. computing system 103. The IP address and port number of the source node, the IP address and port number of the destination node, and the associated protocol such as TCP or UDP, may be referred to as 5-tuple. The 5-tuple uniquely identifies a TCP/IP connection between the source node and the destination node. The 5-tuple constitutes the header of a data packet. By way of example, the computing systems 101 and 103 may communicate with each other through TCP protocol. The computing system 101 may have an IP address IP_101 and port number PORT_101, and the computing system 103 may have an IP address IP_103 and port number PORT_103. Therefore, a data packet flowing from the computing system 101 to the computing system 103 through a connection such as a request packet, will have a 5-tuple [IP_101, IP_103, PORT_101, PORT_103, TCP], and may be referred to as a data packet in the forward direction with respect to the computing system 101. A data packet flowing from the computing system 103 to the computing system 101 through the same connection, such as a response packet, will have a 5-tuple [IP_103, IP_101, PORT_103, PORT_101, TCP], and may be referred to as a data packet in the backward direction with respect to the computing system 101. It can be seen that the source IP address and port number and the destination IP address and port number are reversed in the forward direction and the backward direction. It should be noted that the above example is provided for illustration purpose. In alternative embodiments, the computing system 103 may act as a source node and the computing system 101 as a destination node. As such, a data packet having a 5-tuple [IP_103, IP_101, PORT_103, PORT_101, TCP] may be referred to as in the forward direction with respect to computing system 103, and a data packet having a 5-tuple [IP_101, IP_103, PORT_101, PORT_103, TCP] may be referred to as in the backward direction with respect to computing system 103. A data packet may be of a different IP version, either IPv4 or IPv6. Data packets of IPv4 and IPv6 differ in the size of headers where IPv6 data packets have a larger header size compared to that of IPv4 data packets. The source node and destination node may be connected through a suitable a communication channel. By way of example, a suitable communication channel may include a TCP session between a client and a server such as a Telnet or Secure Shell (SSH) session.

Symmetric RSS is a process of mapping data packets in both the forward and backward directions through the same connection, providing load-balancing on the same processing core or processor in a computing system. LSB based symmetric RSS refers to an RSS process based on least significant bits of a hash value of a data packet, as will be described in greater detail below in conjunction with FIGS. 3-4.

Figure 2:
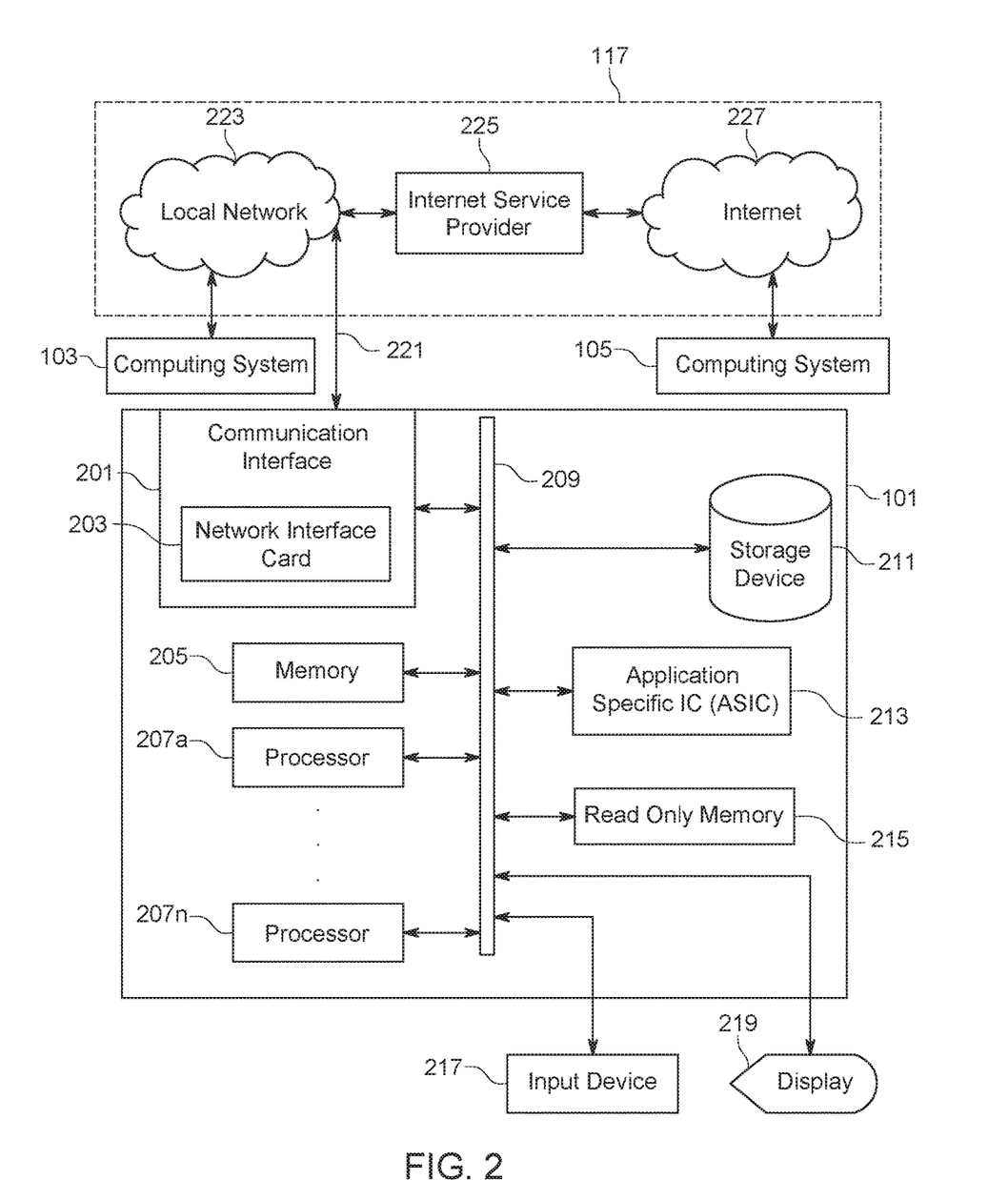
FIG. 2 is a block diagram illustrating an example computing system in which the techniques described in various embodiments of this disclosure can be implemented.

FIG. 2 is a block diagram illustrating a computing system 101 in which embodiments of the disclosure may be implemented. The computing system 101 is a multiprocessor system comprising a plurality of processing cores or processors 207a-207n. The computing system 101 may communicate, as illustrated, with the computing system 103 over a local network 223 and with the computing system 105 over the Internet 227. The internet 227, maintained by an internet service provider 225, and the local network 223 constitute the network 117 exemplarily illustrated in FIG. 1.

As shown in FIG. 2, the computing system 101 comprises a communication mechanism such as a bus 209 for passing information between other internal and external components of the computing system 101. Information (which may also be referred to as data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The bus 209 includes one or more parallel conductors of information so that information is transferred quickly among devices coupled to the bus 209. The processors 207a-207n for processing information are coupled with the bus 209.

Each of the processors 207a-207n may perform a set of operations on the data packet assigned to it by a network interface card 203 in a communication interface 201 of the computing system 101. The set of operations may be defined as a computer program code comprising instructions for the operation of the processors 207a-207n and/or computing system 101 to perform specified functions stored in a computer readable storage medium e.g. a memory 205. The code, for example, may be written in a computer programming language that is compiled into a native instruction set of the processor. The code may also be written directly using the native instruction set (e.g. machine language). The set of operations include bringing information in from the bus 209 and placing information on the bus 209. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processors 207a-207n is represented to the processor 207a-207n by information called instructions, such as an operation code of one or more digits. A sequence of operations to be executed by the processors 207a-207n, such as a sequence of operation codes, constitute processor instructions, also called computer system instructions or, simply, computer instructions. The processors 207a-207n may be implemented as mechanical, electrical, magnetic, optical, chemical or quantum components, among others, alone or in combination.

The processors 207a-207n refer to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processors 207a-207n are implemented as a processor set comprising, for example, a programmed microprocessor and a math or graphics co-processor. The processors 207a-207n may be selected, for example, from the Intel® processors such as the Itanium® microprocessor or the Pentium® processors, Advanced Micro Devices (AMD®) processors such as the Athlon® processor, Ultra-SPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The term computer-readable storage medium e.g. the memory 205 is used herein to refer to any medium that participates in providing information to the processors 207a-

207*n*, including instructions for execution. Such a medium may take many forms, including, but not limited to, non-volatile media, volatile media and transmission media. Non-volatile media include, for example, optical or magnetic disks, such as storage device 211. Volatile media include, for example, dynamic memory 205. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Memory 205 is coupled to the bus 209. Memory 205 may be a random-access memory (RAM) or other dynamic storage device, stores information including the instructions for processors 207*a*-207*n*. Dynamic memory allows information stored therein to be changed by the computing system 101. RAM allows a unit of information stored at a location called a memory address to be stored and retrieved independently of information at neighboring addresses. Memory 205 may also be used by processors 207*a*-207*n* to store temporary values during execution of processor instructions. The computing system 101 may also include a read only memory (ROM) 215 or other static storage device coupled to the bus 209 for storing static information, including instructions, that are not changed by the computing system 101. Some memory is composed of volatile storage that loses the information stored thereon when power is lost. Also coupled to the bus 209 may be a non-volatile (persistent) storage device 211, such as a magnetic disk, optical disk or flash card, for storing information, including instructions, that persists even when the computing system 103 is turned off or otherwise loses power.

Information, including instructions for processing of data packets in the forward and/or backward directions, is provided to the bus 209 for use by the processors 207*a*-207*n* from an external input device 217, such as a keyboard containing alphanumeric keys operated by a human user, or a sensor. A sensor detects conditions in its vicinity and transforms those detections into physical expression compatible with the measurable phenomenon used to represent information in computing system 101. Other external devices coupled to the bus 209, used primarily for interacting with humans, include a display device 219, such as a cathode ray tube (CRT) or a liquid crystal display (LCD), or plasma screen or printer for presenting text or images, and a pointing device, such as a mouse or a trackball or cursor direction keys, or motion sensor, for controlling a position of a small cursor image presented on the display 219 and issuing commands associated with graphical elements presented on the display 219. In some embodiments, for example, where the computer system 101 may perform all functions automatically without human input, one or more of the external input devices 217, the display device 219, and the pointing device can be omitted.

As shown, special purpose hardware, such as an application specific integrated circuit (ASIC) 213, may be coupled to the bus 209. The special purpose hardware is configured to perform operations not performed by the processors 207*a*-207*n* quickly enough for special purposes. Examples of application specific ICs include graphics accelerator cards for generating images for display 219, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computing system 101 may also include one or more instances of communication interface 201 coupled to the bus 209. The communication interface 201 provides a one-way or two-way communication coupling to a variety of external devices that operate with their own processors, such as printers, scanners and external disks. In general, the coupling is with a network link 221 that is connected to a local network 223 to which a variety of external devices, such as, the computing system 103, etc., with their own processors are connected. For example, communication interface 201 may be a parallel port or a serial port or a universal serial bus (USB) port on a personal computer. In some embodiments, the communication interface 201 is an integrated service digital network (ISDN) card or a digital subscriber line (DSL) card or a telephone modem that provides an information communication connection to a corresponding type of telephone line. In some embodiments, the communication interface 201 may be a cable modem that converts signals on the bus 209 into signals for a communication connection over a coaxial cable or into optical signals for a communication connection over a fiber optic cable. As another example, the communication interface 201 may be a local area network (LAN) card to provide a data communication connection to a compatible LAN, such as Ethernet. Wireless links may also be implemented. For wireless links, the communication interface 201 sends or receives or both sends and receives electrical, acoustic or electromagnetic signals, including infrared and optical signals, which carry information streams, such as digital data. For example, in wireless handheld devices, such as mobile telephones like cell phones, the communication interface 201 includes a radio band electromagnetic transmitter and receiver called a radio transceiver. In certain embodiments, the communications interface 201 enables connection to the communication network 117 via the network interface card 203.

Figure 3:
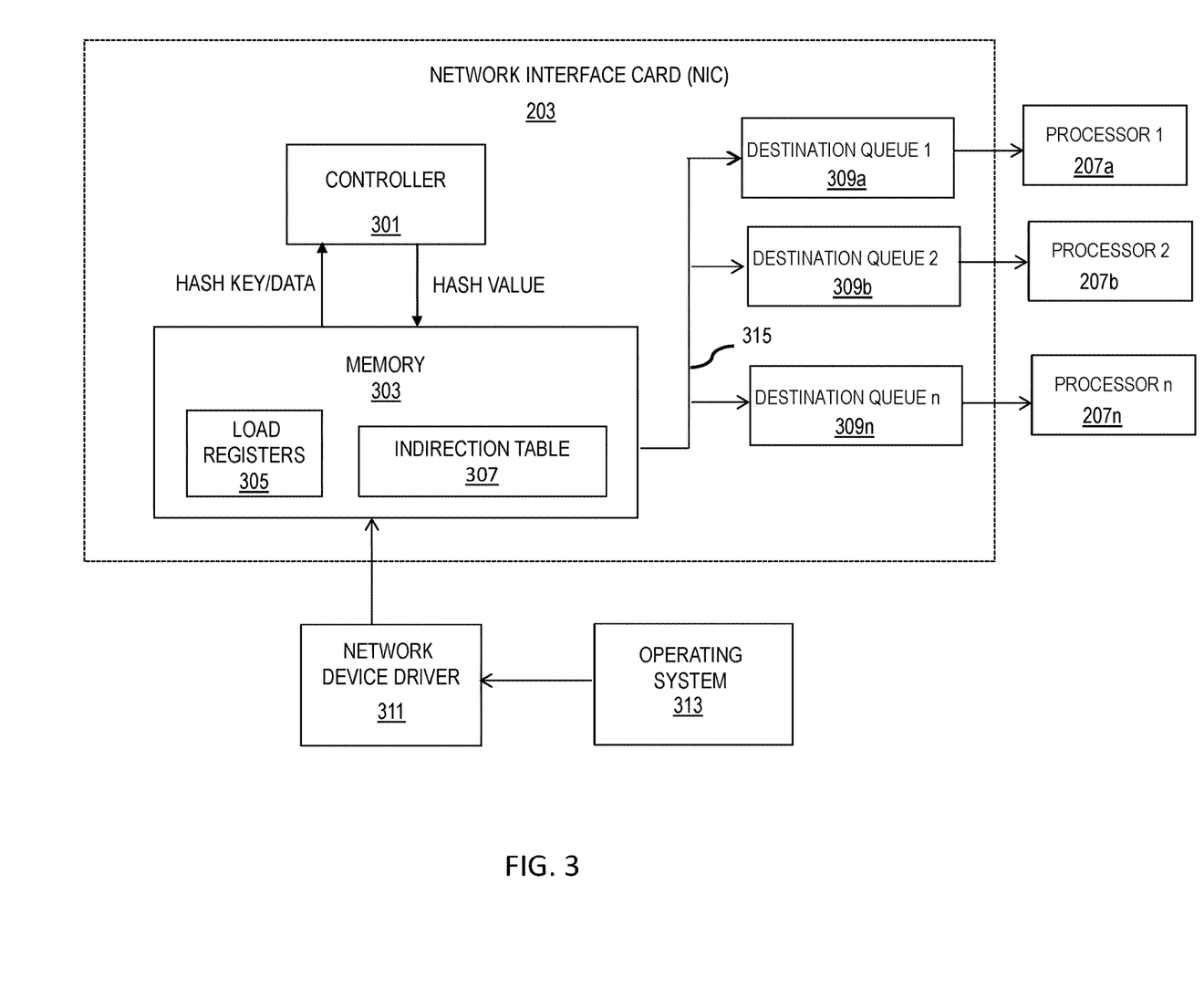
FIG. 3 is a block diagram illustrating a network interface card (NIC) in which the techniques described in various embodiments of this disclosure can be implemented.

FIG. 3 is a block diagram illustrating an apparatus or a network interface card (NIC) 203 included in the computing system 101 shown in FIG. 2. The NIC 203 can assign a plurality of data packets to the processors 207*a*-207*n*, in accordance with embodiments of the disclosure. As shown, the NIC 203 may comprise a controller 301, a computer readable storage medium e.g. memory 303, a plurality of destination queues 309*a*-309*n*, and an interface circuitry 315. The controller 301 may be configured to execute computer program instructions stored in the memory 303. The controller 301 may refer to any of one or more microprocessors, central processing unit (CPU) devices, finite state machines, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions.

The computer readable storage medium, memory unit 303, stores the programs and data for execution by the controller 301. The computer readable storage medium refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random-access memory (DRAM), which typically constitute a main memory. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to the controller 301. The memory 303 may also store temporary variables and other intermediate information used during execution of the instructions by the controller 301. The network interface card 203 may further comprise a read only memory (ROM) or another type of static storage device that stores static information and instructions for the controller 301.

The memory 303 may comprise load registers 305 where the data packets can be loaded by a network device driver 311. In an embodiment, information regarding the loading of processors 207a-207n may be stored in the load registers 305. The memory 303 may also store hash keys for generating hash values for data packets to be described in greater detail below. The memory 303 may further comprise an indirection table 307. The indirection table 307 may be preconfigured whose entries identify the processing cores or processors 207a-207n for processing the data packets stored in the load registers 305. The indirection table 307 may be indexed by LSBs of the hash value in preconfiguring of the indirection table 307. The indirection table 307 may direct the controller 301 of the NIC 203 to route each of the plurality of data packets to a destination queue 309a, 309b, ..., or 309n. Each of the destination queues corresponds to a processor. For example, destination queue 309a has a corresponding processor 207a, destination queue 309b has a corresponding processor 207b, and so on. In some embodiments, some of the components or some elements of these components, such as, 301, 303, 305, 307, 309a-309n, 311, and 313, may be located outside the NIC 203.

The NIC 203 may transmit and/or receive a plurality of data packets in the forward and/or backward directions. The NIC 203 stores the data packets in the load registers 305. In an embodiment, the controller 301 of the NIC 203 controls the flow of data packets from and/or to the load registers 305. The controller 301 may fetch hash keys stored in the memory 303. Using the hash keys and the header in the data packets, the controller 301 may generate a hash value for each of the data packets using a hash function to be described in greater detail below. Based on the LSBs of the hash values of the data packets and the information on the indirection table 307, the controller 301 may select a destination queue 309a, 309b, ..., or 309n and a corresponding processor 207a, 207b, ..., or 207n to process each of the plurality of data packets.

An operating system 313 in the computing system 101 may control a network device driver 311 to route the plurality of data packets, in the forward and/or backward directions, to the load registers 305. The processors 207a-207n may execute the operating system 313, for example, the Linux® operating system, the Unix® operating system, any version of the Microsoft® Windows® operating system, the Mac OS of Apple Inc., etc. The computing system 101 employs the operating system 313 for performing multiple tasks. The operating system 313 is responsible for management and coordination of activities and sharing of resources of the computing system 101. For example, the operating system 313 may reconfigure the entries of the indirection table 307 for load balancing between the processors 207a-207n. The operating system 313 may further manage security of the computing system 101, peripheral devices, such as, the input device 217 and the display 219 connected to the computing system 101, and network connections, such as the network link 221. The operating system 313 may recognize, for example, inputs from the input device 217, the display 219, the data packets in the forward direction and the backward direction over the network 117. The operating system 313 may provide load information of each processor 207a-207n to the network interface card 203 through the network device driver 311.

Figure 4:
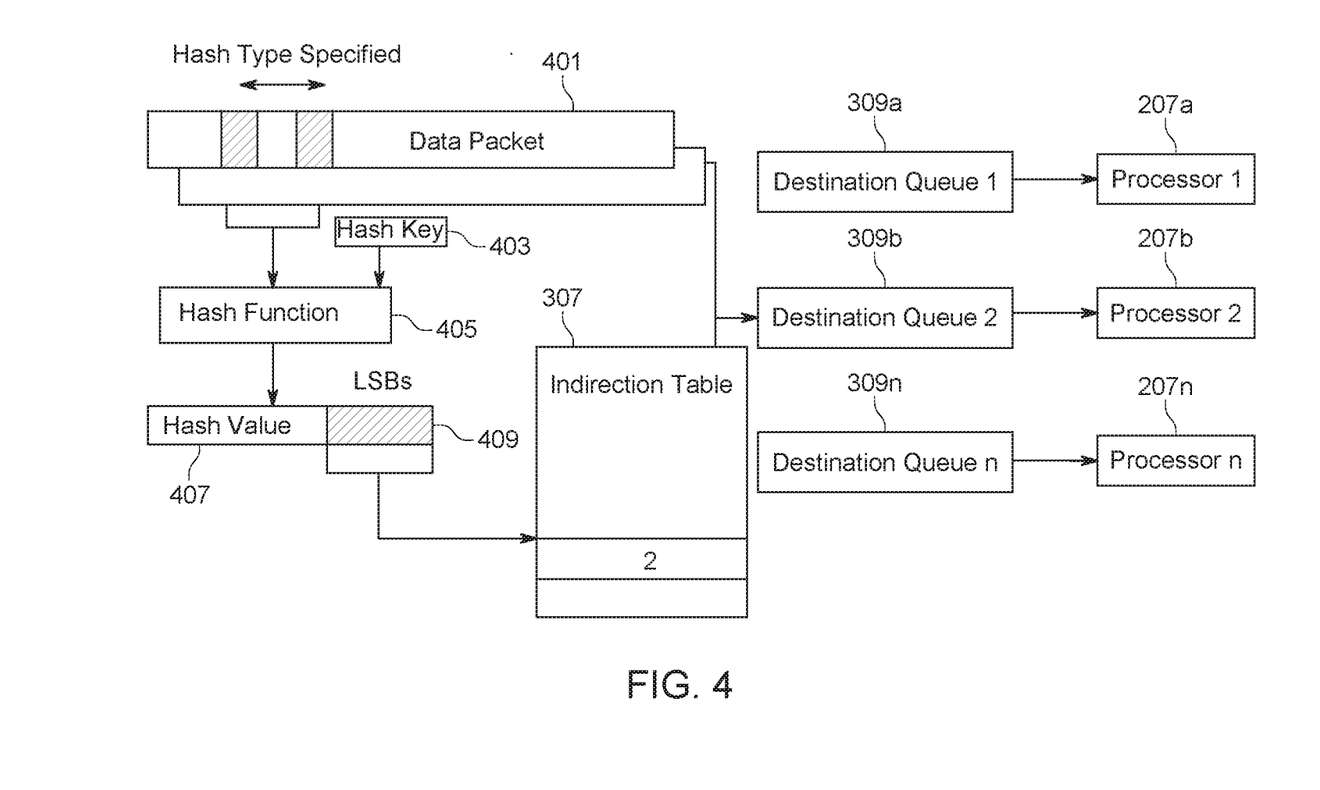
FIG. 4 is a block diagram illustrating an implementation of LSB based symmetric RSS according to embodiments of this disclosure.

FIG. 4 is a block diagram illustrating implementation of LSB based symmetric RSS in the NIC 203 of the computing system 101 in accordance with some embodiments of the disclosure. As shown, the NIC 203 may receive a data packet 401 ("receiving data packet"). The receiving data packet 401 may have a header and payload. The header may be 5-tuple comprising the source IP address, the source port number, the destination IP address, the destination port number, and the protocol type (TCP or UDP). The receiving data packet 401 may be an IPv4 data packet or an IPv6 data packet. In some instances, the receiving data packet 401 may not have a header type such as the TCP or the UDP. The controller 301 in the NIC 203 may have to determine the IP version of the receiving data packet 401 and further the presence of the type of the header associated with the IP version. That is, the controller 301 of the NIC 203 may identify a hash type of the receiving data packet 401. The hash type in the receiving data packet 401 identifies the area of the receiving data packet 401 for which a hash value 407 is to be computed.

By way of example, when the receiving data packet 401 is an IPv4 data packet with a source IP address of length 4 bytes or 32 bits, destination IP address of length 4 bytes or 32 bits, the source port number of 2 bytes or 16 bits, and the destination port number of 2 bytes or 16 bits, the header of the receiving data packet 401 is 12 bytes long. The controller 301 computes the hash value 407 for the 12 bytes or 96 bits of header of the receiving data packet 401.

In some embodiments, the controller 301 determines that the type of header such as TCP or UDP is absent in the IPv4 receiving data packet 401. The controller 301 may compute the hash value 407 corresponding to the source IP address of length 4 bytes and the destination IP address of length 4 bytes. In some embodiments, the hash type of the receiving data packet 401 may be preconfigured by the operating system 313 of the computing system 103. If the hash type is preconfigured to compute the hash value 407 only for the source IP address and the destination IP address and in case the source port number and the destination port number are present in the receiving data packet 401, the controller 301 may parse the receiving data packet 401 and skip over the source port number and the destination port number in the receiving data packet 401. Similarly, the controller 301 of the NIC 203 may determine the hash type of the IPv6 receiving data packet 401. In some embodiments, the IP header of the receiving data packet 401, i.e., the source and the destination IP addresses, and the TCP header of the receiving data packet 401, i.e., the source and destination port numbers may be non-contiguous. The controller 301 of the NIC 203 may parse and identify the areas in the header of the receiving data packet 401 based on the hash type to generate a corresponding hash value 407.

Still referring to FIG. 4, the controller 301 of the NIC 203 employs a hash function 405 to compute the hash value 407 of the bits in the header of the receiving data packet 401 based on the hash type. The hash function 405 utilizes a hash key 403, which can be generated using the techniques of this disclosure to be described in greater detail below in conjunction with FIGS. 6 and 7A-7B. The controller 301 determines a number of least significant bits (LSBs) 409 of the hash value 407. Using the LSBs 409 of the hash value 407 and based on the information on the indirection table 307, the controller 301 can route the data packet 401 to a destination queue e.g. 309b corresponding to a processor e.g. 207b.

For symmetric RSS, the hash values 407 can be calculated through the following hash function. Numerically, consider the header of the receiving data packet 401 is represented as an array, input[ ] of length n bytes, where input [j] indicates the $j^{th}$-bit index in input [ ], the byte stream of the header of the receiving data packet 401 to be hashed by the hash function 405 may be represented as follows:

input[0] input[1] input[2] . . . input[n−1].

The left-most byte of the byte stream of the header of the receiving data packet 401 is input [0], and the most-significant bit of input [0] is the left-most bit. The right-most byte of the header of the receiving data packet 401 is input [n−1], and the least-significant bit of input [n−1] is the right-most bit.

A pseudocode for generation of the hash value 407 by the controller 301 can be given as below:

```
ComputeHash (input [ ], n) {
    // initialize result to 0
    result = 0
        For each bit b in input[ ] from left to right
    {
        // the input is XORed with the key data, whenever there is a
        "1" bit
            if (b == 1) result ^= (left-most 32 bits of K)
        shift K left 1 bit position
    }
    return result
}
```

In the above hash calculation, a secret key (K) of 40 bytes (320 bits) long is used. The input is XORed with the key data, whenever there is a bit with value of "1" instead of "0". It should be noted that other hash functions known in the art can alternatively be used.

Figure 5:
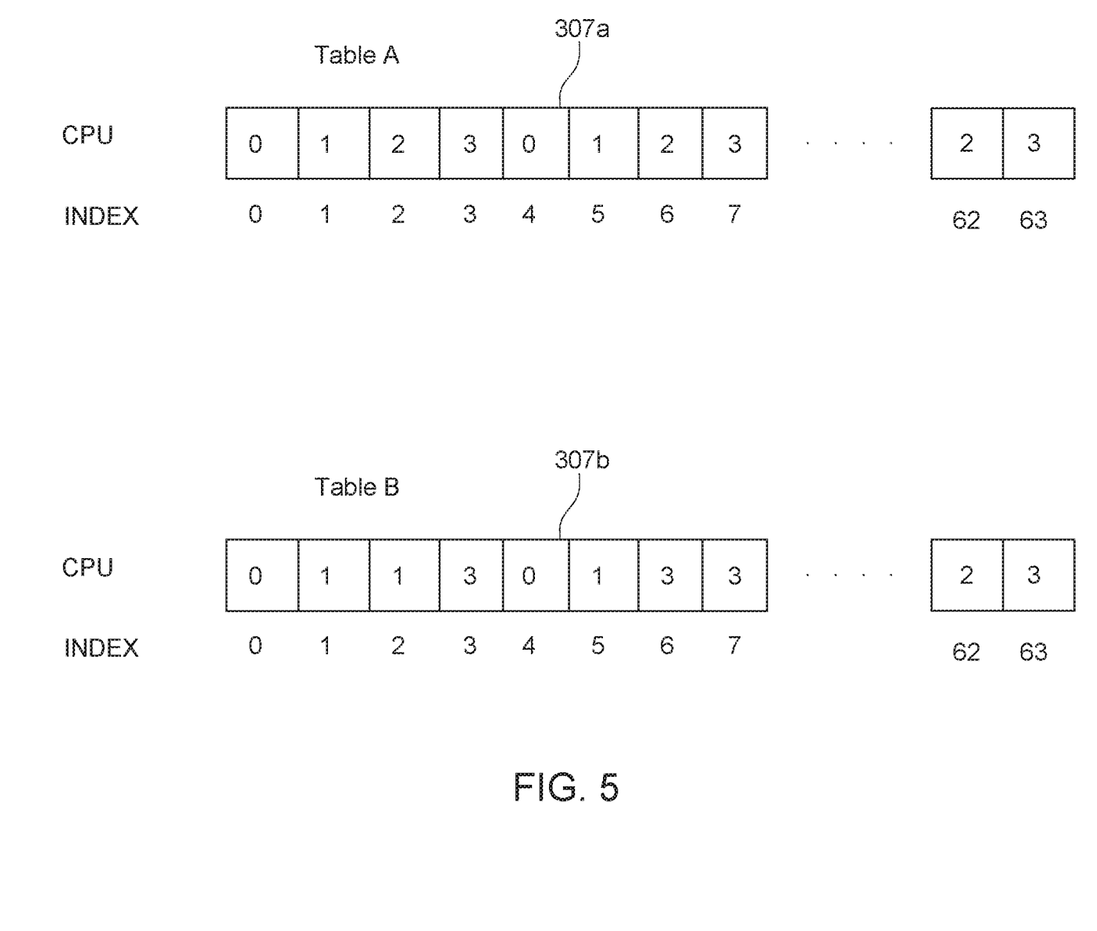
FIG. 5 illustrates example indirection tables showing indexing of processors in accordance with embodiments of this disclosure.

FIG. 5 illustrates embodiments of the indirection table 307a and 307b for assigning a plurality of data packets to a plurality of processing cores or processors 207a-207n. The exemplary indirection tables 307a and 307b assume a four (4) processor computing system with processor number from 0-3, and the number of LSBs used for indexing the indirection tables 307a and 307b is 6 bits. Therefore, the indirection table 307a and 307b contain 64 entries.

The indirection table 307a may list an initial mapping to a destination queue corresponding to a processor. For example, the hash value of index 5 may be initially mapped to processor 1 and the hash value of index 1 may also be mapped to the processor 1. As normal traffic load varies among the processors, the network device driver 311 may detect the unbalanced condition and change the values in the indirection table 307a to rebalance the load by defining a new indirection table 307b. The indirection table 307b lists the new mapping of the hash values to the destination queues, and subsequently to the processors. As can be observed, in the indirection table 307b, some of the load from processor 2 is moved to processor 1 and processor 3. The size of the indirection table 307 is typically two to eight times the number of processors 207a-207n in the computing system.

Figure 6:
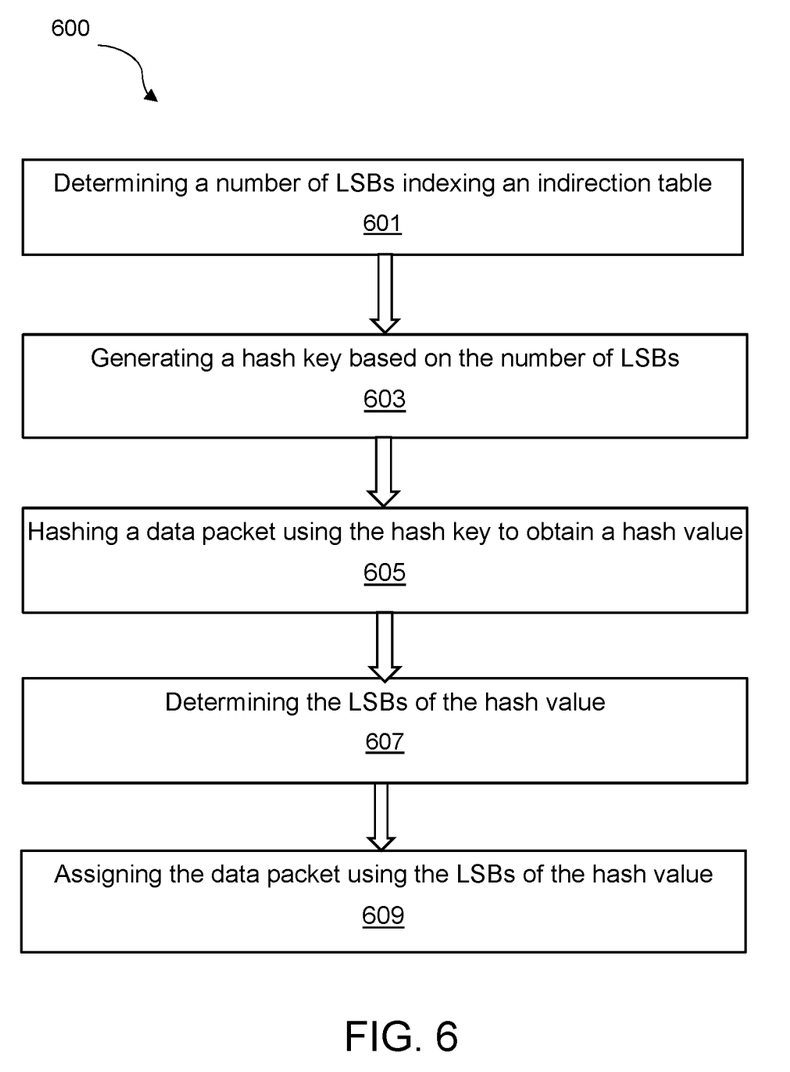
FIG. 6 is a flow diagram illustrating a method for generating hash keys in accordance with embodiments of this disclosure.

FIG. 6 is a flow diagram illustrating a method 600 for generating hash keys in accordance with some embodiments of the disclosure. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 303 of the NIC 203 of FIG. 3, employing an embodiment of the present invention and executed by the controller 301 of the network interface card 203. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 303 that may direct a computer or other programmable apparatus to function in a particular manner, such that the instructions stored in the computer-readable memory 303 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

In general, at block 601 the method 600 comprises determining a number of least significant bits (LSBs) used for indexing an indirection table in a computing system including a plurality of processing cores. At block 603, the method 600 comprises generating a hash keys based on the information of the number of LSBs used for indexing the indirection table.

Figure 7A:
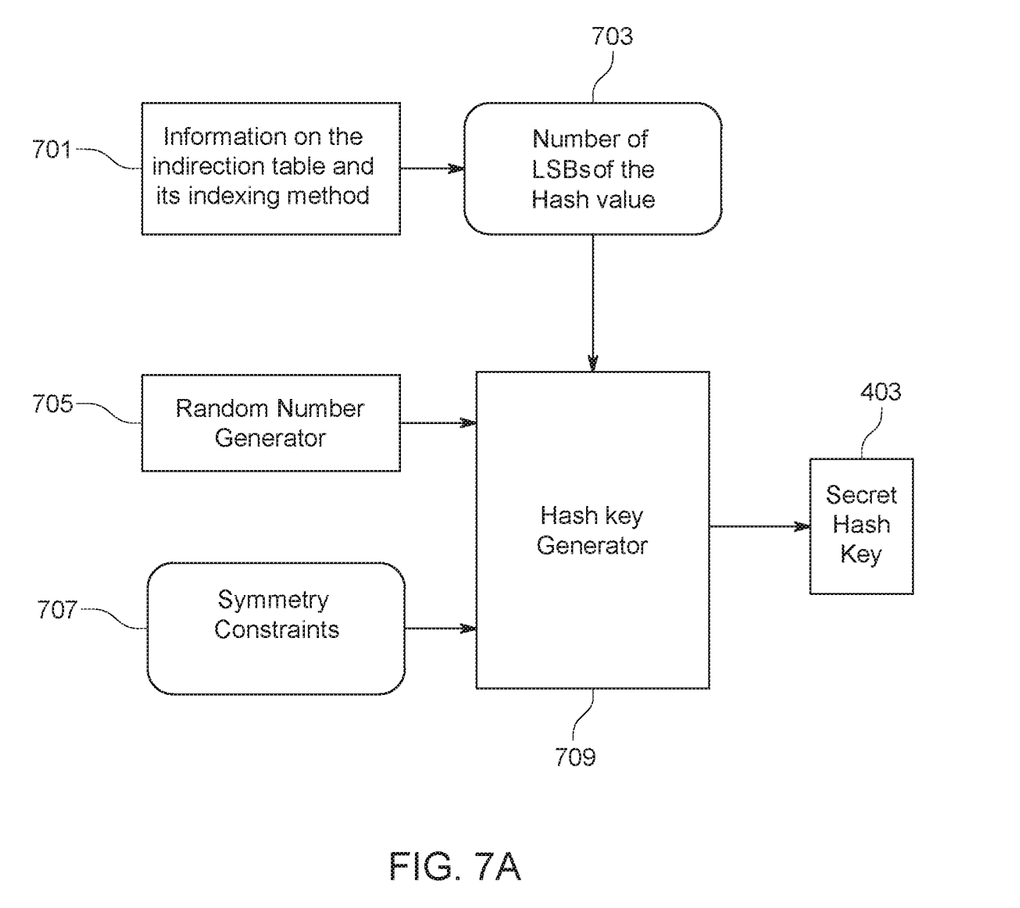
FIGS. 7A-7B are diagrams illustrating example steps for generating hash keys in accordance with embodiments of this disclosure.
Figure 7B:
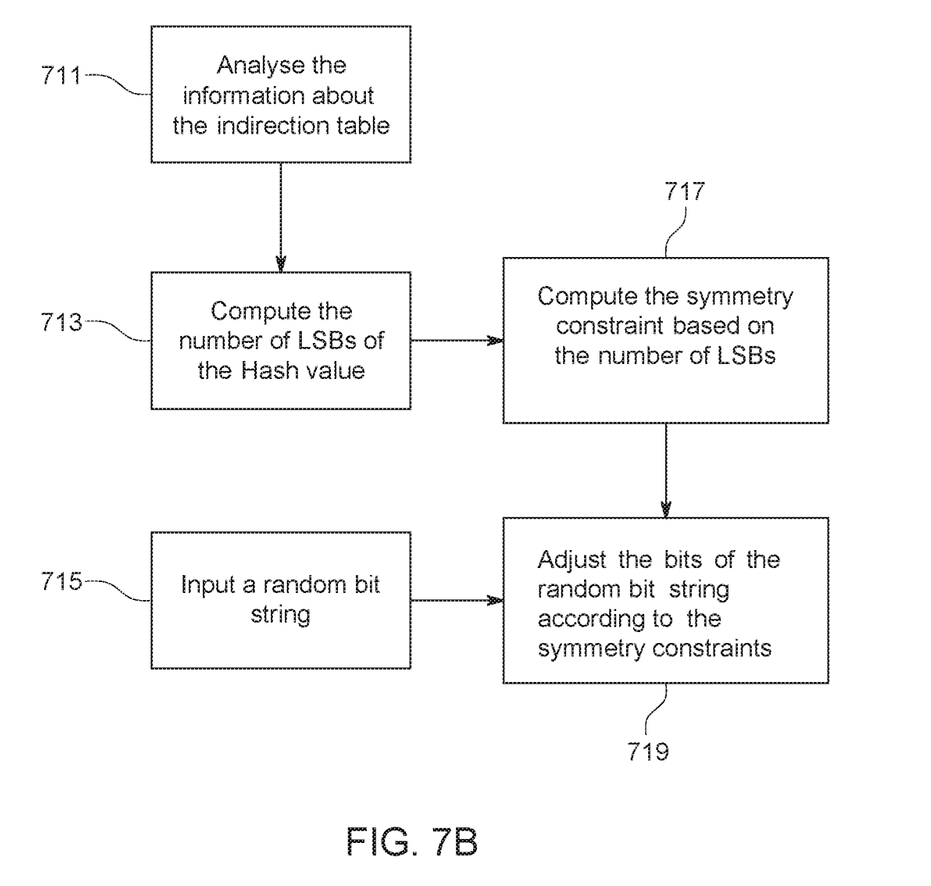

FIGS. 7A-7B are block diagrams illustrating example steps for generating a hash key for a data packet in accordance with an example embodiment. As shown in FIG. 7A, the NIC 203 in the computing system 101 may employ a hash key generator 709 to generate a hash key. At block 701, the controller 301 of the NIC 203 may obtain information about the indirection table 307 including the indexing of the indirection table 307. At block 703, the controller 301 may determine the number of LSBs of hash values used for indexing the indirection table 307. The number of LSBs refers to the length of a bit string of LSBs. For example, the number of LSBs may be an integer ranging from 1-31. The controller 301 may communicate with a random number generator 705 to generate a random number comprising a string of bits. The random number generator 705 may be a hardware random number generator that generates random numbers, or a pseudo-random number generator that generates numbers that appear random, but may be deterministic, and can be reproduced if the state of the pseudo-random number generator is known. The controller 301 inputs the random number generated by the random number generator 705 to the hash key generator 709. At block 707, the controller 301 may input symmetry constraints that ensure symmetric RSS of the data packets, to be described in greater detail below, to the hash key generator 709. The hash key generator 709 outputs the secret hash key 403 with the bits of the generated random number adjusted to meet the symmetry constraints.

As further illustrated in FIG. 7B, at block 711, the controller 301 of the NIC 203 analyses the information about the indirection table, such as, the number of entries and indexing of the indirection table. At block 713, the controller 301 computes the number of LSBs 409 of the hash values used for indexing the indirection table. The controller 301 further computes the symmetry constraints based on the number of LSBs, to be described in greater detail below. The random number generator 705 generates a random string of bits as described and shown in FIG. 7A. At block 715, the controller 301 inputs the generated random bit string to the hash key generator 709 and the hash key generator 709 adjusts the bits of the random bit string according to the symmetry constraints to generate a hash key 403 that ensures symmetric RSS.

The generation of the hash keys may be done off-line. For example, the generation of the hash keys which satisfy the symmetry constraints may be done on a separate device, such as a random number generator 705 or a hash key generator 709 external to the NIC 203. Alternatively, the generation of the hash keys may be done when the network devices such as the NIC 203 is being initialized for handling data packets.

Symmetry constrains define conditions that ensure symmetric RSS. By way of example, for a data packet of IPv4 type with TCP or UDP header, Let X[A:B] be the bits of X from A-th bit to B-th bit and X[A] be the A-th bit of X. So, $$\text{result}[j] = \left( \sum_{i=1}^{n} \text{input}[i] * K[i+j-1] \right) \mod 2 \quad (1)$$

where n is the length of input in bits, j is the jth bit in the hash value.

Let Inputforward=[source ip, destination ip, source port, destination port]. It has 96 bits of input data for the forward direction with source IP and destination IP being 32 bit each and source port and destination port being 16 bit each.

Let Inputbackward=[destination ip, source ip, destination port, source port]. It also has 96 bits of the corresponding input for backward direction with source IP and destination IP being 32 bit each and source port and destination port being 16 bit each.

Thus, $$\text{resultforward}[j] = \left( \sum_{i=1}^{96} \text{inputforward}[i] * K[i+j-1] \right) \mod 2$$

$$\text{resultbackward}[j] = \left( \sum_{i=1}^{96} \text{inputbackward}[i] * K[i+j-1] \right) \mod 2$$

Mathematically, $$\text{resultforward}[j] = \left( \sum_{i=1}^{96} \text{inputforward}[i] * K[i+j-1] \right) \mod 2 =$$

$$\left( \sum_{i=1}^{32} \text{inputforward}[i] * K[i+j-1] + \quad \text{//corresponding to source } IP \text{ address in the forward direction} \right.$$

$$\sum_{i=33}^{64} \text{inputforward}[i] * K[i+j-1] + \quad \text{//corresponding to the destination } IP \text{ in the forward direction}$$

$$\sum_{i=65}^{80} \text{inputforward}[i] * K[i+j-1] + \quad \text{//corresponding to the source port in the forward direction}$$

$$\sum_{i=81}^{96} \text{inputforward}[i] * \quad \text{//corresponding to the destination port in the}$$

$$\left. K[i+j-1] \right) \mod 2 \quad \text{forward direction}$$

$$\text{resultbackward}[j] = \left( \sum_{i=1}^{96} \text{inputbackward}[i] * K[i+j-1] \right) \mod 2 =$$

$$\left( \sum_{i=1}^{32} \text{inputforward}[i] * K[i+j+31] + \quad \text{//corresponding to destination } IP \text{ starting at } 32th \text{ bit in the forward direction} \right.$$

$$\sum_{i=33}^{64} \text{inputforward}[i] * K[i+j-33] + \quad \text{//corresponding to source } IP \text{ starting at the beginning in the forward direction}$$

$$\sum_{i=65}^{80} \text{inputforward}[i] * K[i+j+15] + \quad \text{//corresponding to destination port starting at } 81th \text{ bit in the forward direction}$$

$$\sum_{i=81}^{96} \text{inputforward}[i] * \quad \text{//corresponding to source port starting at } 65th \text{ in}$$

$$\left. K[i+j-17] \right) \mod 2 \quad \text{the forward direction}$$

To hold the symmetric property for forward and backward direction, some LSBs of the hash values of forward direction and corresponding LSBs of the hash values of backward direction need to be equal.

For any j, to make resultforward [j]=resultbackward [j] for any input, the following conditions or symmetry constraints for the key need to be satisfied:

$$K[i+j+31]=K[i+j-1] \text{ for } 1 \leq i \leq 32 \quad (2)$$

$$K[i+j+15]=K[i+j-1] \text{ for } 65 \leq i \leq 80 \quad (3)$$

The above conditions for generating the hash key is based on IPv4 data packets with TCP or UDP header. In a similar manner, the controller 301 may generate a hash key for the non-TCP/UDP IPv4 data packets or IPv6 data packets. For example, for non-TCP/UDP IPv4 data packets, the condition (3) may be skipped.

For any given number of CPUs or processing cores, when the LSBs of the hash value used to index the indirection table is determined or known, a corresponding number of LSBs may be set to guarantee the symmetric property. Once the number of LSBs are determined, hash keys may be generated to satisfy the condition (2) and (3) for any j in the number of LSBs. It could be done off-line with pre-computation or on-line when the packet processor is initialized or configured.

By way of example, if the size of the indirection table is 256 entries and the indirection table 307 is indexed by 8 LSBs of the hash value, that is, bit 25 to bit 32 in the hash value, the hash key K only needs to satisfy the following conditions or symmetry constraints to guarantee the symmetric property of the RSS based on the LSB:

$K[i+j+31]=K[i+j-1]$ for $1 \leq i \leq 32, 25 \leq j \leq 32$ $K[i+j+15]=K[i+j-1]$ for $65 \leq i \leq 80, 25 \leq j \leq 32$ Therefore, if X[A:B] be the bits of X from $A^{th}$ bit to $B^{th}$ bit and X[A] be the $A^{th}$ bit of X, then based on the above conditions:

$K[32:56]=K[64:88]$ $K[96:104]=K[112:120]$ $K[25:31]=K[57:63]=K[89:95]=K[105:111]=K[121:127]$

Based on the above conditions, an example of the hash key generated online or offline by the controller 301 is as below:

| | |
|---|---|
| 0x6d5a, 0x56da, | //bit 0-31 |
| 0x255b, 0x0eda, | //bit 32-63 |
| 0x255b, 0x0edb, | //bit 64-95 |
| 0x43db, 0x43da, | //bit 96-127 |
| 0xd0ca, 0x2bcb, | //bit 128-159 |
| 0xae7b, 0x30b4, | //bit 160-191 |
| 0x77cb, 0x2da3, | //bit 192-223 |
| 0x8030, 0xf20c, | //bit 224-255 |
| 0x6a42, 0xb73b, | //bit 256-287 |
| 0xbeac, 0x01fa | //bit 288-320 |

Returning to FIG. 6, the method 600 may further comprise, at block 605, applying a hash function to a data packet received by the computing system using a hash key generated according to the method described above. At block 607, the method comprises determining the LSBs of the hash value. At block 609, the method proceeds to assign the data packet to one of the multiple processing cores using the LSBs of the hash value by looking up the indirection table.

Therefore, according to embodiments of the method 600, for assigning a receiving data packet to one of the multiple processing cores, the controller 301 may hash the header of the receiving data packet 401, using the generated hash key 403, to obtain hash values 407 with the LSBs 409. Based on the LSBs 409 of the hash value 407, the controller 301 may look up the indirection table 307 and select an entry. Based on the corresponding entry in the indirection table 307, the controller 301 may determine a destination queue to route the receiving data packet 401 from the load registers 305, and further routes the receiving data packet 401 from the destination queue to a processing core.

On implementing the embodiment disclosed herein, the end result generated by the network interface card is a tangible determination of LSB-based symmetric receive side scaling (RSS) in the network interface card. The network interface card implements the LSB-based RSS, and thereby assigns each of the plurality of data packets to a processor in a multiprocessor computing system. On implementing the LSB-based symmetric RSS, the computing system achieves distributed processing of the data packets. The network interface card of the computing system distributes data packets to multiple processors. Further, the computing system can achieve in-order processing of the distributed data packets. The network interface card can preserve the order of delivery of the distributed data packets. For each network connection, the network interface card processes the data packets on an associated processor. Furthermore, the network interface card can perform dynamic load balancing of the processors. The implementation of the LSB-based symmetric RSS provides a means to rebalance the network processing load between the processors as host system load varies. To rebalance the load, the entries in the indirection table are changed as described above.

The network interface card generates a secure hash value, that is, a signature of a data packet that provides added security. The signature protects the computing system from malicious remote hosts that might attempt to force the computing system into an unbalanced state.

Various embodiments of the disclosure provide an improvement in networking technology especially in the areas of computing system performance. With implementation of LSB-based symmetric RSS, the network interface card reduces processing delays by distributing receive processing from the network interface card across multiple processors, thereby ensuring that a single processor is not heavily loaded while another processor is idle. Furthermore, the LSB-based symmetric RSS ensures that the packet processing that is associated with a given TCP/IP connection stays on the assigned processor. Also, in LSB-based symmetric RSS, the hash key generated need not have symmetry about a central bit in the generated hash key, thus reducing stringent processing by the controller 301 of the network interface card.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. Further, the term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise.

Those skilled in the art will appreciate that various other modifications may be made. All these or other variations and modifications are contemplated by the inventors and within the scope of the invention.

What is claimed is:

1. A computer-implemented method, comprising:
   determining a number of least significant bits (LSBs) associated with indexing of an indirection table in a computing system including multiple processing cores;
   generating a hash key for implementation in the computing system, wherein the generating of the hash key comprises:
      computing symmetry constraints for a request packet and a response packet through a same communication channel,
         wherein the symmetry constraints include at least a first condition where LSBs of a hash value corresponding to a source or destination IP address of the request packet are equal to LSBs of a hash value corresponding to a destination or source IP address of the response packet, and wherein the LSBs of the hash value of the request packet and the LSBs of the hash value of the response packet are of a number same as the number of LSBs associated with indexing of the indirection table; and adjusting a random or pseudorandom string of bits to satisfy the symmetry constraints to generate the hash key, applying a hash function using the hash key to a data packet received by the computing system to obtain a hash value of the data packet based on the hash function, determining LSBs of the hash value of the data packet; and assigning the data packet to one of the multiple processing cores using the indirection table and the LSBs of the hash value of the data packet.

2. The computer-implemented method of claim 1, wherein the symmetry constraints include a second condition where LSBs of a hash value corresponding to a source or destination TCP or UDP port number of the request packet are equal to LSBs of a hash value corresponding to a destination or source TCP or UDP port number in the response packet.

3. The computer-implemented method of claim 1, wherein the number of the LSBs associated with the indexing of the indirection table is an integer ranging from 1-31.

4. The computer-implemented method of claim 1, wherein the request packet and response packet comprise one of IPv4 and IPv6 data packets.

5. The computer-implemented method of claim 1, wherein the request packet and response packet comprise one of IPv4 and IPv6 data packets including one of TCP and UDP headers.

6. The computer-implemented method of claim 1, wherein the symmetry constraints comprise conditions defined by the following equations:

$$K[i+j+31]=K[i+j-1] \text{ for } 1 \leq i \leq 32 \qquad (2)$$

$$K[i+j+15]=K[i+j-1] \text{ for } 65 \leq i \leq 80 \qquad (3)$$

wherein
K[] represents the generated hash key,
i represents an $i^{th}$ bit of a header of an input packet in IPv4 and j represents a $j^{th}$ bit in the hash value.

7. The computer-implemented method of claim 1, wherein the communication channel comprises a TCP session between a client and a server including one of a Telnet and Secure Shell sessions.

8. A non-transitory computer-readable medium having stored thereon program code instructions that, when executed by a computing apparatus, cause the computing apparatus to carry out operations to generate a hash key, the operations comprising:

determining a number of least significant bits (LSBs) associated with indexing of an indirection table in a computing system including multiple processing cores; and generating a hash key for implementation in the computing system, wherein the generating of the hash key comprises:

computing symmetry constraints for a request packet and a response packet through a same communication channel, wherein the symmetry constraints include at least a first condition where LSBs of a hash value corresponding to a source or destination IP address of the request packet are equal to LSBs of a hash value corresponding to a destination or source IP address of the response packet, and wherein the LSBs of the hash value of the request packet and the LSBs of the hash value of the response packet are of a number same as the number of LSBs associated with indexing of the indirection table; and adjusting a random or pseudorandom string of bits to satisfy the symmetry constraints to generate the hash key;

applying a hash function using the hash key to a data packet received by the computing system to obtain a hash value of the data packet based on the hash function, determining LSBs of the hash value of the data packet; and assigning the data packet to one of the multiple processing cores using the indirection table and the LSBs of the hash value of the data packet.

9. The non-transitory computer-readable medium of claim 8, wherein the symmetry constraints include a second condition where LSBs of a hash value corresponding to a source or destination TCP or UDP port number of the request packet are equal to LSBs of a hash value corresponding to a destination or source TCP or UDP port number in the response packet.

10. The non-transitory computer-readable medium of claim 8, wherein the number of the LSBs associated with the indexing of the indirection table is an integer ranging from 1-31.

11. The non-transitory computer-readable medium of claim 8, the request packet and response packet comprise one of IPv4 and IPv6 data packets.

12. The non-transitory computer-readable medium of claim 8, wherein the request packet and response packet comprise one of IPv4 and IPv6 data packets including one of TCP and UDP headers.

13. The non-transitory computer-readable medium of claim 8, wherein the symmetry constraints comprise conditions defined by the following equations:

$$K[i+j+31]=K[i+j-1] \text{ for } 1 \leq i \leq 32 \qquad (2)$$

$$K[i+j+15]=K[i+j-1] \text{ for } 65 \leq i \leq 80 \qquad (3)$$

wherein
K[] represents the generated hash key,
i represents an $i^{th}$ bit of a header of an input packet in IPv4 and j represents a $j^{th}$ bit in the hash value.

14. The non-transitory computer-readable medium of claim 8, wherein the communication channel comprises a TCP session between a client and a server including one of a Telnet and Secure Shell sessions.

15. An apparatus, comprising:
a memory storing computer-readable program code instructions; and
a controller configured to execute the program code instructions, wherein the computer-readable program code instructions comprise:
determining a number of least significant bits (LSBs) associated with indexing of an indirection table in a computing system including multiple processing cores;
generating a hash key for implementation in the computing system, wherein the generating of the hash key comprises:

computing symmetry constraints for a request packet and a response packet through a same communication channel,
  wherein the symmetry constraints include at least a first condition where LSBs of a hash value corresponding to a source or destination IP address of the request packet are equal to LSBs of a hash value corresponding to a destination or source IP address of the response packet, and
  wherein the LSBs of the hash value of the request packet and the LSBs of the hash value of the response packet are of a number same as the number of LSBs associated with indexing of the indirection table; and
  adjusting a random or pseudorandom string of bits to satisfy the symmetry constraints to generate the hash key;
applying a hash function using the hash key to a data packet received by the computing system to obtain a hash value of the data packet based on the hash function,
determining LSBs of the hash value of the data packet; and
assigning the data packet to one of the multiple processing cores using the indirection table and the LSBs of the hash value of the data packet.

16. The apparatus of claim 15, wherein the symmetry constraints include a second condition where LSBs of a hash value corresponding to a source or destination TCP or UDP port number of the request packet are equal to LSBs of a hash value corresponding to a destination or source TCP or UDP port number in the response packet.

17. The apparatus of claim 15, wherein the number of the LSBs associated with the indexing of the indirection table is an integer ranging from 1-31.

18. The apparatus of claim 15, wherein the request packet and response packet comprise one of IPv4 and IPv6 data packets.

19. The apparatus of claim 15, wherein the symmetry constraints comprise conditions defined by the following equations:

$$K[i+j+31]=K[i+j-1] \text{ for } 1\leq i\leq 32 \quad (2)$$

$$K[i+j+15]=K[i+j-1] \text{ for } 65\leq i\leq 80 \quad (3)$$

wherein
K[] represents the generated hash key,
i represents an $i^{th}$ bit of a header of an input packet in IPv4 and j represents a $j^{th}$ bit in the hash value.

20. The apparatus of claim 15, wherein the communication channel comprises a TCP session between a client and a server including one of a Telnet and Secure Shell sessions.

* * * * *